United States Patent [19]
Keller

[11] 3,801,140
[45] Apr. 2, 1974

[54] PRE-INSULATED PIPE CONDUIT WITH TEST PASSAGE

[75] Inventor: James Paul Keller, Alexandria, Va.

[73] Assignee: John L. Renshaw Inc., Beltsville, Md.

[22] Filed: Aug. 15, 1972

[21] Appl. No.: 280,839

[52] U.S. Cl. .................................... 285/47, 285/93
[51] Int. Cl. ............................................. F16l 11/12
[58] Field of Search ............. 285/47, 48, 50, 52, 93, 285/286, 292

[56] References Cited
UNITED STATES PATENTS

| 2,497,914 | 2/1950 | Sawyer | 285/47 X |
| 2,732,227 | 1/1956 | Kaiser | 285/47 |
| 3,453,716 | 7/1969 | Cook | 285/286 X |

Primary Examiner—Kenneth Downey

[57] ABSTRACT

Disclosed is a pipe conduit assembly having an inner conduit for a working fluid, an outer, protective covering conduit, an insulating material therebetween and an additional test passage, the latter being useful to test the integrity of the conduit joints after lengths of the conduit are assembled on the site of eventual use.

8 Claims, 8 Drawing Figures

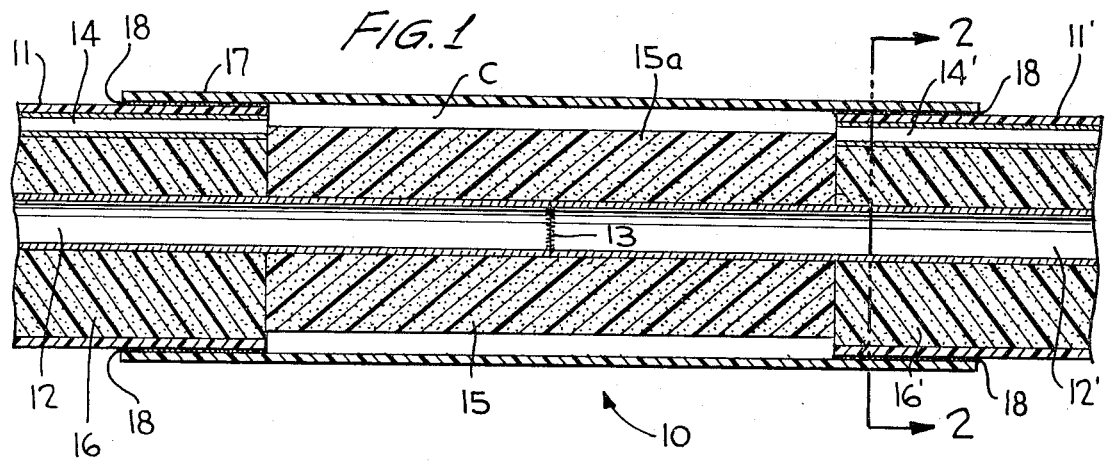
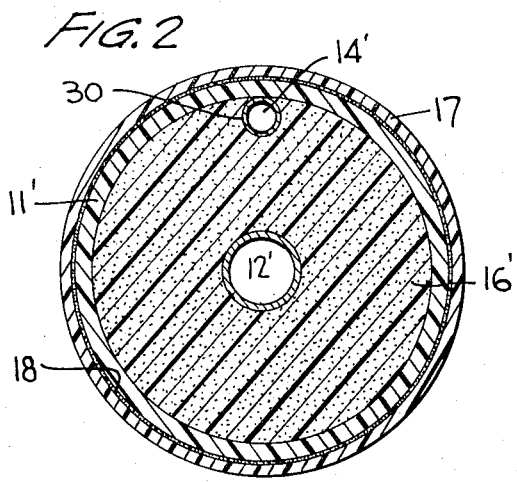
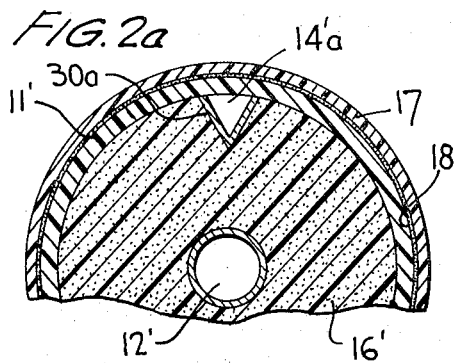
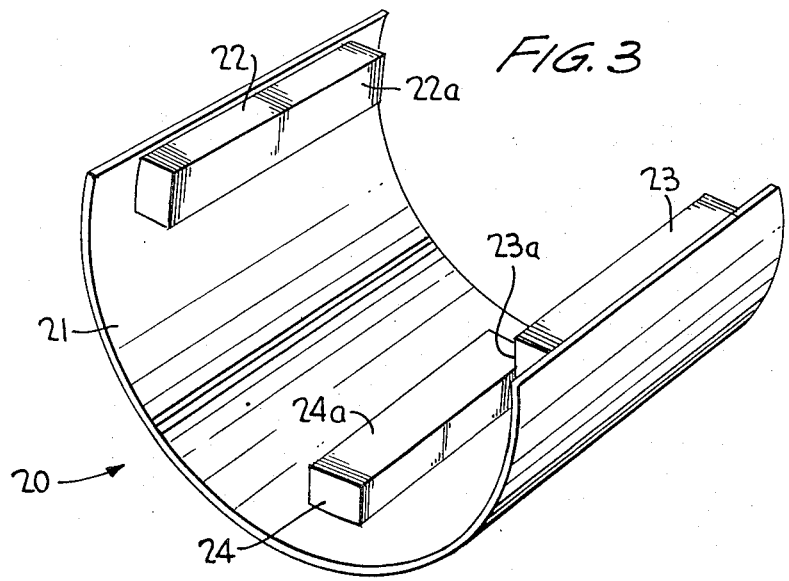

PATENTED APR 2 1974 3,801,140
SHEET 2 OF 2
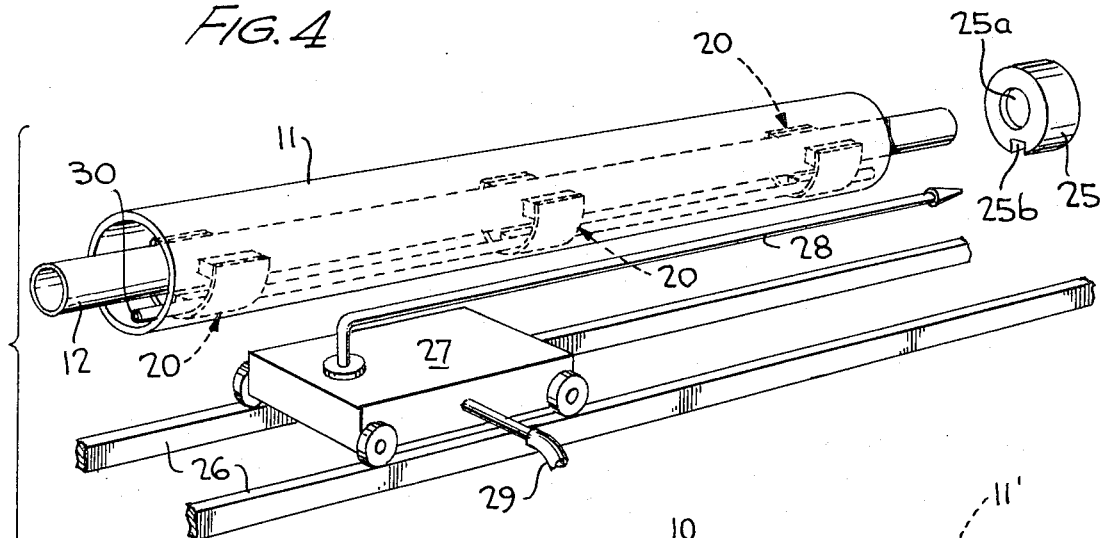
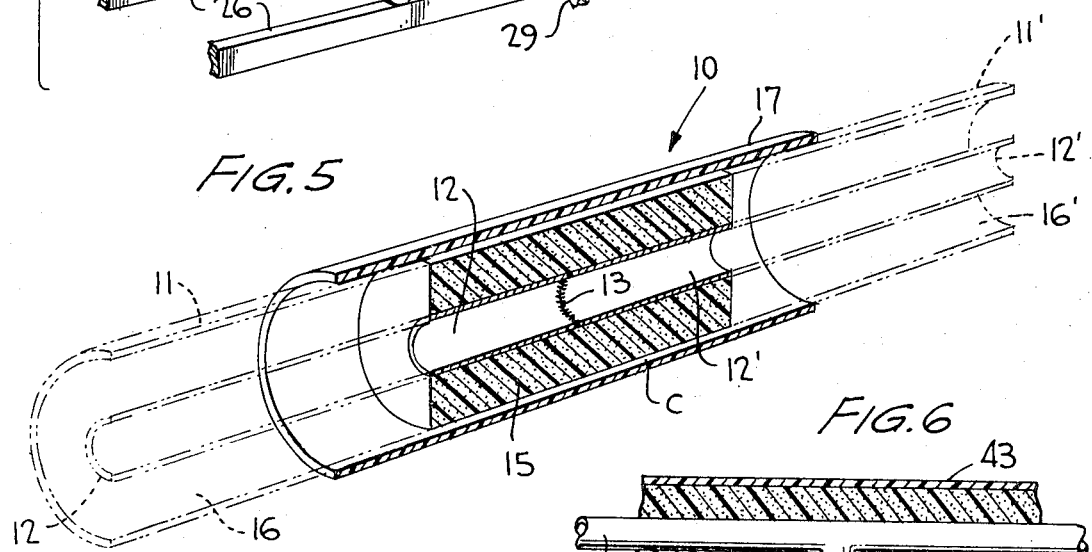
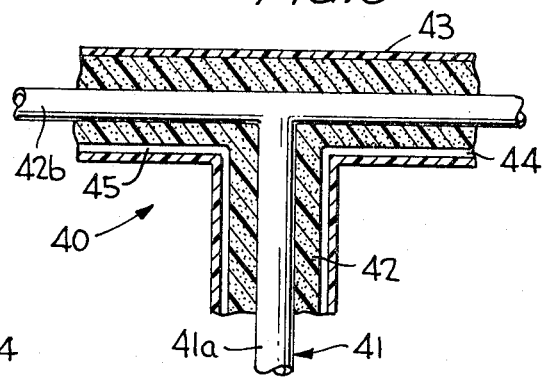
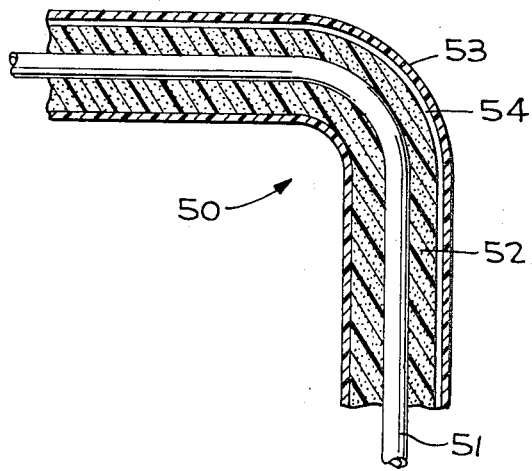

PRE-INSULATED PIPE CONDUIT WITH TEST PASSAGE

BACKGROUND OF THE INVENTION

The present invention relates to a pipe conduit, and more particularly, to a pipe conduit which is pre-insulated with foam-like material, such as closed-cell polyurethane, and has a pressure test passage to assure in a simple manner that the conduit joints are virtually leakage free.

In pipe conduits which are to be used for subsurface locations, it is conventional to provide a metallic pipe having a protective sheath concentrically therearound with a layer of insulation therebetween. Such arrangement is shown, for example, in United States Pat. No. 3,453,716, wherein the metallic pipe has a section which constitutes a free cylindrical end adapted to be butted and welded to the free cylindrical end of another pipe section in the field. After two such pipe sections are joined and welded, a sleeve which is made of the same material as the protective sheath such as, for example, fiber glass reinforced phenol formaldehyde resin, is placed over the area of the free cylindrical ends of the butted and welded pipes. A polyurethane foam is then sprayed through a hole in the sleeve and into the void and allowed to expand to provide insulation for preventing energy loss from the working fluid.

In pipe conduits of the above-described type which are utilized for underground locations, it is particularly important that the joint formed between the various sections of the exterior protective sheath or jacket has very high integrity, i.e., a joint which will not leak to allow ground water or the like to leak in and destroy the insulation. In the past, several methods have been utilized to test for the integrity of insulation such as shown, for example, in U.S. Pats. Nos. 3,299,417; 3,183,022; and 3,232,640. Although each of said patents discloses a somewhat complex structure for the purpose of ascertaining the integrity of the particular joint on a joint-by-joint basis, it has become particularly desirable from an economic point of view to have a pipe conduit construction which would allow all of the joints to be tested at one time and from a single location rather than to check each joint as it is being constructed.

SUMMARY OF THE INVENTION

Accordingly, it is an aim of the present invention to overcome the disadvantages encountered with the prior art pipe conduits and, more particularly, to provide a pipe conduit which permits the testing of the integrity of all of the exterior sheath or jacket joints at one time from a single location. The same means permitting the testing of the jacket joints may also be used to test the integrity of the joints in the working fluid conduit.

The foregoing problems and disadvantages have been solved in accordance with the present invention by providing each section of the pipe conduit with a pressure test passage interiorly adjacent to the pipe jacket and extending the entire length of each pipe conduit section. In practice, the pipe conduit sections are assembled by inserting into the pipe jacket a working fluid pipe having supporting fixtures or jigs attached thereto. These supporting fixtures or jigs are to support the working fluid pipe in co-axial alignment within the pipe jacket prior to the insertion of insulating foam. The pipes for each pipe conduit section are longer than the jackets so that a portion of the working pipe will extend from each end of the conduit to facilitate assembly of the system in the field.

Before the foam insulation is sprayed into the pipe jacket, means for creating a pressure testing passage are inserted in contiguous relationship with the inner surface of the pipe jacket. According to one embodiment of the present invention, the pressure test passage can be in the form of a small diameter tubular conduit made of plastic or the like. If desired, provision can be made to remove this conduit after formation of a pressure test passage, but I have found it more convenient to allow the conduit to remain within the finished pipe conduit section so that the interior of the conduit itself forms the pressure test passage. It is to be understood, however, that other means may be employed for forming said pressure test passage. For example, a V-shaped extruded member made of plastic or the like may be inserted into the pipe jacket prior to insertion of the foam insulation. In such a case, the open portion of the V is placed against the interior surface of the pipe jacket, i.e., the tips of each of the V legs abut the interior surface of the pipe jacket. Again, after insertion of the foam insulation, the member forming the pressure test passage can be removed, if desired, or can be allowed to remain in the finished pipe conduit section.

The next step in the assembly of the pipe conduit sections is to insert the insulating foam in the annulus defined by the interior of the pipe jacket and the exterior circumference of the working fluid pipe. This working fluid pipe is generally formed of metal. An annular plug of rigid polyurethane foam is inserted in one end of the pipe conduit to provide an end wall for the annulus to thereby confine the insulating foam as it expands and hardens. A movable cart has operatively attached thereto an elongated member which is slightly longer than each of the individual pipe jacket sections. This elongated member is connected by hoses to supply means for the chemical components of the foam insulation. The elongated member is inserted into the annulus until it is almost abutting the rigid polyurethane plug and foam is conveyed into the annulus defined by the pipe jacket and the metal pipe and allowed to expand and harden. More specifically, the elongated feeding member is inserted into the annulus at the open end portion of the pipe jacket until its end is adjacent to the plug closing the free end of the pipe jacket. An operator can then selectively actuate a switch or the like for initiating the supply of liquid polyurethane through the elongated feeding member and at the same time begin to withdraw the member back out of the space at a predetermined rate as the foam begins to expand and fill the annular void. The supporting fixtures which are located inside the pipe jacket need not be removed and, therefore, can become a part of the finished pipe conduit section. The feeding member continues to be withdrawn at a rate dependent on the size of the annular void and the rate of expansion of the polyurethane foam so that suffcent polyurethane is present to completely fill the void after expansion and hardening. The other end of the conduit is then closed with another polyurethane plug to confine the expanding foam. Both end plugs have small slots formed therethrough to accommodate the test passage forming means.

In the finished conduit section, the metal pipe which carries the working fluid protrudes from each end of the pipe jacket. To assemble the pipe conduit sections in the field, they are positioned in, for example, trenches in the ground at the site of ultimate use. It is not necessary to align the pipes so that the pressure test passage of each conduit section is in longitudinal alignment with the others. The protruding working fluid pipes are butted together and may be joined in a conventional manner, such as by welding.

All the working fluid pipes in the run are welded and these joints are pressure tested. It is, of course, necessary to insulate the exposed metal pipe sections after they are joined. To facilitate this insulation, a short length of slip joint pipe jacket with an inside dimension permitting a snug telescoping fit with the outside surface of the conduit jacket is prepositioned on the end of the conduit. The metallic pipes are joined and then two preformed, semi-cylindrical insulating members, each with a U-shaped cross section, are positioned over the exposed metallic pipe to form a cylindrical body of insulation that completely encompasses the metal pipe. They may be taped together for convenience. In one embodiment, the outside diameter of the cylindrical body of insulation is such that a portion of the pressure test passage is uncovered, thereby permitting air to pass from the pressure test passage of one section to the pressure test passage of another section.

The short length of slip joint pipe jacket is then slid along the conduit so that it completely covers the cylindrical body of insulation and overlaps the ends of both the lengths of insulated conduit. A cement of conventional composition is employed to seal the slip joint pipe jacket to the pipe jacket of the insulated conduits. This procedure is repeated over and over again until all of the slip joints have been sealed.

The integrity of the conduit joints may be tested as follows. If, for example, the conduit is being used to convey heating fluid from a central heating plant to an apartment building or the like, the conduit will be laid in a ground trench extending between the two buildings. After the conduit sections are joined but before the trench is backfilled, approximately seven pounds per square inch of air pressure is applied to the pressure test passage from one of the buildings. A low pressure such as 7 p.s.i. has been found desirable to avoid crushing the foam insulation in the conduit. The test passage end in the other building would be plugged for the test. By means of a pressure gauge, the pressure in the test passage may be monitored and if it drops, a leak in one of the joints is indicated. The leak may be isolated by applying, for example, soap water to the pipe jacket joints and watching for bubbles.

The test passage is also useful to determine if leaks develop in the working fluid pipe. Although the welds are pre-tested at the time of installation, defects or faults may develop at a later time. Corrosion of the pipe is another factor that may cause a leak. If working fluid leaks through a fault or defect in the pipe or welded joint, the working fluid will pass through the space between the two preformed foam insulating members surrounding the joint and from there to the pressure test passage. Working fluid will eventually issue from the pressure test passage at the point in the heating plant that allowed access to initially pressurize the passage for the jacket joint test. This latter feature of the pipe conduit of my invention allows a continuous monitoring of the conduit in use, limited in time only by the life of the conduit.

If desired, the pressure test passage may be plugged midway between the two ends of the assembled conduit. In such an installation, one half of the conduit could be tested from each end of the conduit to facilitate the isolation of the particular joint that may be leaking. As is apparent, only one half of the joints would have to be tested to locate the leak.

These and other features, objects and advantages of the present invention will become apparent from the following description when taken in conjunction with the accompanying drawings which show, for purposes of illustration only, several embodiments of the present invention and wherein:

BRIEF DESCRIPTION OF THE DRAWINGS

FIG. 1 is a cross-sectional view of one assembled joint of the pipe conduit along the longitudinal axis thereof;

FIG. 2 is a cross-sectional view along line II—II of FIG. 1;

FIG. 2a is a partial cross-sectional view similar to FIG. 2, showing another type of pressure test passage.

FIG. 3 is an isometric view of one of the supporting jigs of fixtures used in the assembly of the pipe conduit sections;

FIG. 4 is an isometric view, partially in schematic, of the assembly of a pipe conduit section and the cart used to insert foam therein;

FIG. 5 is an isometric view, partially in cross-section, of the assembled joint with portions of the conduits being joined shown in phantom lines;

FIG. 6 is a partial cross-sectional view of another embodiment of the present invention utilized in T-joints; and FIG. 7 is a partial cross-sectional view of still a further embodiment of the present invention for use in elbow joints.

DESCRIPTION OF A PREFERRED EMBODIMENT

Referring now to the drawing and, in particular, to FIG. 1, an assembled pipe conduit joint is designated generally by the numeral 10. Since each pipe conduit section is identical with other sections, similar parts have been designed with primed numerals and will not be discussed separately. Each pipe conduit section consists of an outer pipe jacket 11 which is preferably made of plastic material or the like and which is able to withstand weight loads when filled with foam and resist corrosive or other detrimental environmental effects when the pipe conduit is located in an underground position. The pipe jacket 11 is generally cylindrical in shape, although it is within the scope of the present invention to employ various configurations for the pipe conduit. In each pipe conduit section, a pipe 12, which can be made of metal such as iron, copper, or the like, is located concentrically within the pipe jacket 11. It is emphasized that pipe 12 may be formed of many types of material such as glass, cement asbestos, plastic, iron, copper, etc., although most applications employ pipe formed of metal. In like manner, pipe jacket 11 may be formed of metal, cement asbestos, or the like (although glass has insufficient strength in some applications) but most applications employ a pipe jacket formed of plastic such as polyvinyl chloride.

Pipe 12 is designed to carry the particular working fluid such as, for example, hot water and has a length relative to jacket 11 so that a portion of the pipe protrudes from each end of the pipe conduit section. By way of example only, if pipe jacket 11 is 20 feet long, pipe 12 may be 21 ½ feet long so that nine inches of pipe 12 may extend from either end of the pipe conduit section. The space between the interior wall of the pipe jacket 11 and the outer surface of the pipe 12 defines an annulus along the length of the pipe conduit section. This annular void is filled with a foam insulating material 16 of known composition. The pipe and jacket diameters are chosen to provide an annular void of sufficient size to enclose sufficient foam insulation for the particular service in which the conduit is placed.

The foam insulation 10 may consist of closed-cell polyurethane foam which is sprayed into the annular space and allowed to expand and set. Prior to inserting the foam insulating material into the pipe conduit section, a pressure test passage 14 in accordance with the present invention is provided. The pressure test passage 14 may take the form of a cylindrical conduit 30 which extends the full length of each pipe conduit section and is adjacent the interior surface of the pipe jacket. It is to be emphasized that the test passage need only be a void in the insulation along the interior surface of the jacket. Conduit 30 forms a barrier to the foam as it expands, and other barriers such as V-shaped length of plastic 30a may be used to form a void 14a such as indicated in FIG. 2a.

As shown in FIG. 1, the assembled pipe conduit joint 10 includes means to protect the exposed portions of pipes 12 after they are butted and joined together at 13 in a conventional manner such as by welding or the like. Each joint includes a slip joint jacket 17 which is so dimensioned that, in the assembled form, each end of the joint 17 overlaps or telescopes with a portion of the adjoining pipe jacket 11. Before sliding the slip joint jacket to its final position, two semi-cylindrical preformed pipe coverings 15 and 15a having a U-shaped cross-section and having an interior diameter substantially the same as the outside diameter of pipe 12 are placed around the pipe. These coverings may be of any conventional material such as fiberglass or polyurethane foam. Both coverings form a cylindrical insulation package 15–15a that encompasses the exposed metal pipe joint. It is necessary to provide clearance C between the inside of slip joint jacket 17 and the exterior of the insulation package formed from pipe coverings 15 and 15a to permit pressure communication between test passage 14 and test passage 14'. Clearance C is particularly visible in FIG. 1 and FIG. 5. Although clearance C is illustrated as having been provided by dimensioning cylindrical insulation package 15–15a such that its outside diameter is less than the inside diameter of pipe jacket 11 or 11' thereby exposing a portion of the ends of passages 14 and 14', pressure communication between test passages 14 and 14' may be provided by other dimensioning. For example, the outside diameter of insulation package 15–15a may be less than the inside diameter of slip joint jacket 17 but slightly greater than the inside diameter of pipe jacket 11 or 11'. In the latter instance, the length of insulation package 15–15a would be slightly less than the distance between the facing surfaces of foamed insulation 16 and foamed insulation 16' to permit pressure communication between the test passages. All that is essential for the proper operation of my invention is some means to provide pressure communication from one pipe conduit section test passage to the test passage in the adjoining pipe conduit section.

A joint cement 18 is placed around the exterior surface of each of the adjoining ends of the pipe jackets 11 and 11' so that an air-tight joint may be created with the interior surface of slip joint jacket 17 when it is slid into position. Joint cement 18 is seen most clearly in FIG. 2.

Each of the pipe conduit sections is assembled with the aid of the supporting jig or fixture 20 such as the one shown in FIG. 3. More specifically, fixture 20 may consist of a semi-cylindrical member 21 which can be formed of heavy gauge sheet metal or the like and which has an outer diameter which is slightly smaller than the inner diameter of the pipe jacket 11. The length of the supporting jig 20 is quite small when compared to the axial length of each pipe jacket 11 and may, in fact, be only several inches. If, again by way of example only, the pipe jacket 11 is 20 feet long, the supporting fixture 20 will have a length of approximately 6 inches. Three elongated support members 22, 23, 24 are fixed at 90° intervals along the interior surface of the supporting fixture by conventional means. The thickness of each of members 22, 23 and 24 is such that when the radially innermost surfaces 22a, 23a and 24a are in contact with pipe 12, there is provided means for positioning pipe 12 within and in co-axial alignment with pipe jacket 11.

The fabrication of the pipe section will now be explained with refererence to FIG. 4. Although only one pipe conduit section is shown in this figure, it must be appreciated that a large number of such conduit sections will be laid out in a frame at their place of fabrication in such manner that their longitudinal axes are substantially parallel. To initiate the fabrication of the pipe conduit section, a plurality of support jigs 20 are attached to pipe 12 by conventional means such as by gluing. The number of jigs require is a function of the type of pipe 12 employed in the conduit section. For example, a two inch outside diameter copper pipe will require a jig at both ends and one in the center as shown in FIG. 4. Two inch outside diameter steel pipe is more rigid and requires a jig only at both ends of pipe 12.

Pipe 12 and its attached support jigs 20 is then inserted into pipe jacket 11 with a given length of pipe 12 extending from both ends of jacket 11. Thereafter, tubular conduit 30 for forming pressure test passage 14 is placed in contiguous relationship with the lower interior wall of the pipe jacket 11 and is held in position by gravity. A preformed plug 25 of polyurethane foam having a pipe accommodating bore 25a formed therethrough is then inserted into one end of pipe jacket 11. The support jigs near the ends of pipe 12 may be positioned in a manner to accommodate plug 25 and in some instances the plug may itself act as a supporting jig. Plug 25 also has formed therethrough slot 25b to accommodate pressure test passage forming conduit 30. At this point, a manually operated or automatic cart 27 or the like can be used to insert the chemical components of foam insulation into the annulus defined by the pipe jacket 11 and the metal pipe 12. As shown in FIG. 4, cart 27 may operate along two tracks 26, but it is to be understood that a system with or without tracks can be used. Tracks 26 may themselves be mounted for side to side motion to allow cart 27 to be moved from conduit to conduit as they are positioned in the fabrication frame. The truck 27 has an elongated feeding member 28 which is slightly longer than the pipe jacket 11. This feeding member is also connected to a supply line 29 which is operatively connected to drums containing the separate chemical components of foam insulation. Alternatively, the truck can be so designed as to carry its own supply of chemical components which can be replaced from time to time as needed. To begin insertion of the foam insulation, the cart 27 is brought to a position so that the elongated feeding member 28 is aligned with the conduit and the feeding member is then inserted into the annulus until it almost abuts plug 25. An operator can then selectively activate a switch to initiate pumping of the components of the foam insulation through the feeding member as the cart 27 is moved along the tracks 26 to withdraw the feeding member 28 from the conduit. The feeding member is withdrawn at a rate determined by the size of the annulus and the rate and amount of expansion of the foam insulation. If desired a gas such as Freon 12 may be injected with the chemical components of the foam to improve mixing by agitation. Slot 25b in plug 25 permits air to escape as the foam expands.

After the foam insulation has set, the pipe conduit section is ready to be shipped to its field location for assembly with other pipe conduit sections in the particular installation.

Some installations may require more than a straight pipe conduit. For example, some branching may be required in a particular installation, and this would necessitate the use of a T-section as shown in FIG. 6. Further, the pipe conduit might require an elbow joint as shown in FIG. 7 for carrying the working fluid through a non-rectalinear path. In either case, a pressure test passage may be provided in accordance with the present invention.

Referring first to FIG. 6, joint 40 consists of a T-shaped pipe 41 having a leg member 41a and upper member 42b. A similarly shaped outer pipe jacket 43 surrounds pipe 41 and, as is apparent, leg 41a must be welded to upper member 42b inside jacket 43 to assemble the T joint. Foam insulation 42 is injected into the T joint in a manner similar to that described above. Two pressure test passages 44 and 45 are provided to enable the testing of all of the joints in a branched conduit from a single location.

Elbow joint 50 includes working fluid pipe 51, complimentarily shaped conduit jacket 53 and insulation 52 therebetween. Only one pressure test passage 54 is required.

While I have shown and described several embodiments in accordance with the present invention, it is to be clearly understood that the same is susceptible of numerous changes and modifications as will be apparent to one skilled in the art. I, therefore, do not wish to be limited to the details shown and described herein but intend to cover also such changes and modifications as encompassed by the scope of the present invention.

I claim:

1. In a pipe conduit including at least two pipe conduit assemblies, each assembly having an outer protective covering conduit, a working fluid conduit within said outer protective covering conduit and conduit insulation means within the space between said outer conduit and said working fluid conduit, adjacent ends of said assemblies being connected by a conduit joint, said joint including first means for connecting adjacent working fluid conduits, second means for connecting adjacent outer protective covering conduits, and joint insulation means, the improvement comprising test passage means within said conduit insulation means and longitudinally aligned with said outer protective covering conduit and providing pressure communication between said pipe conduit assemblies through said joint such that the interior of said joint may be pressurized with a testing fluid to test the integrity of said second means.

2. The apparatus of claim 1 wherein said test passage means is a void in said conduit insulation means.

3. The apparatus of claim 2 wherein said joint insulation means is dimensioned such that a pressure communicating void exists within said joint thereby permitting said pressure communication between said pipe conduit assemblies through said joint.

4. The apparatus of claim 3 wherein said second means includes a slip joint pipe jacket positioned to overlap a portion of both of said adjacent outer protective covering conduits and sealing means sealing said jacket to said outer conduits whereby during testing the absence of testing fluid passing through said sealing means indicates a joint of acceptable integrity.

5. A pipe conduit assembly having an outer protective covering conduit of a given length, a working fluid conduit within said outer protective covering conduit and having a length greater than said given length, conduit insulation means within the space between said outer conduit and said working fluid conduit and test passage means within said conduit insulation means and longitudinally aligned with said outer protective covering conduit to permit pressure communication for a test fluid from one end of said assembly to the other end of said assembly.

6. The assembly of claim 5 wherein said test passage means is a void in said conduit insulation means and is said given length.

7. A method of testing the integrity of a pipe conduit joint between two pipe conduit assemblies each having an inner working fluid conduit, an outer protective covering conduit, conduit insulation means in the space between said inner and outer conduits, and a test passage means within said conduit insulation means, the test passage means of one assembly communicating with the test passage means of the other assembly through said joint comprising the steps of pressurizing both said test passage means and the interior portion of said joint between said inner and outer conduits with a test fluid, monitoring the pressure in said test passage means and said joint and detecting any drop in pressure as indicative of unacceptable integrity of said joint.

8. The method of claim 7 applied to a conduit with more than one joint including the step of isolating said joint with unacceptable integrity by detecting passage of said test fluid through said joint.

* * * * *